US011192512B2

(12) United States Patent
Hu et al.

(10) Patent No.: US 11,192,512 B2
(45) Date of Patent: Dec. 7, 2021

(54) AIRBAG ARRANGEMENT

(71) Applicant: Joyson Safety Systems Acquisition LLC, Auburn Hills, MI (US)

(72) Inventors: Jialou Hu, West Bloomfield, MI (US); Andrey Kossev, Clawson, MI (US); Nachiket Pendse, Auburn Hills, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 83 days.

(21) Appl. No.: 16/557,844

(22) Filed: Aug. 30, 2019

(65) Prior Publication Data

US 2020/0070769 A1 Mar. 5, 2020

Related U.S. Application Data

(60) Provisional application No. 62/725,783, filed on Aug. 31, 2018.

(51) Int. Cl.
| | |
|---|---|
| *B60R 21/203* | (2006.01) |
| *B60R 21/205* | (2011.01) |
| *B60R 21/231* | (2011.01) |
| *B60R 21/232* | (2011.01) |
| *B60R 21/00* | (2006.01) |

(52) U.S. Cl.
CPC .......... *B60R 21/203* (2013.01); *B60R 21/205* (2013.01); *B60R 21/232* (2013.01); *B60R 21/23138* (2013.01); *B60R 2021/0009* (2013.01); *B60R 2021/23107* (2013.01)

(58) Field of Classification Search
CPC .... B60R 2021/0009; B60R 2021/0048; B60R 2021/161; B60R 2021/23107; B60R 2021/23161; B60R 2021/23382; B60R 2021/23538; B60R 2021/23576; B60R 21/203; B60R 21/205; B60R 21/231; B60R 21/23138; B60R 21/232
See application file for complete search history.

(56) References Cited

U.S. PATENT DOCUMENTS

| | | | |
|---|---|---|---|
| 8,636,301 B1 | 1/2014 | Wang | |
| 8,678,429 B2 * | 3/2014 | Nagasawa | ............. B60R 21/233 280/731 |
| 8,814,202 B2 | 8/2014 | Matsushita | |

(Continued)

*Primary Examiner* — Laura Freedman
(74) *Attorney, Agent, or Firm* — Gordon Rees Scully Mansukhani, LLP

(57) ABSTRACT

Airbag configurations and systems are provided to protect a vehicle occupant in an oblique crash event. In one embodiment an airbag includes first and second side panels and a main panel coupled to the first side panel along a first seam and coupled to the second side panel along a second seam. The main panel can include a curved configuration to match expansion of the second side panel. The airbag configuration is provided for protection for an oblique crash event to absorb energy from occupant movement in the oblique direction and to retain and reduce head rotation of an occupant. In one embodiment, a method for controlling an airbag system is provided that includes detecting a crash event and activation of an airbag and a side curtain airbag (SCAB). The SCAB may be activated to contact the airbag and to control volume/loading of the airbag.

20 Claims, 10 Drawing Sheets

(56) References Cited

U.S. PATENT DOCUMENTS

| | | | | |
|---|---|---|---|---|
| 8,876,153 | B2 * | 11/2014 | Dix | B60R 21/203 |
| | | | | 280/729 |
| 8,894,094 | B2 | 11/2014 | Wang | |
| 8,899,617 | B2 | 12/2014 | Fukawatase | |
| 8,967,660 | B2 | 3/2015 | Taguchi | |
| 8,998,250 | B2 | 4/2015 | Kruse | |
| 9,108,588 | B2 | 8/2015 | Fukawatase | |
| 9,150,186 | B1 * | 10/2015 | Belwafa | B60R 21/233 |
| 9,199,600 | B2 | 12/2015 | Kawamura | |
| 9,205,798 | B1 * | 12/2015 | Jindal | B60R 21/16 |
| 9,248,799 | B2 | 2/2016 | Schneider | |
| 9,266,494 | B2 | 2/2016 | Wang | |
| 9,272,682 | B2 | 3/2016 | Wang | |
| 9,296,360 | B2 * | 3/2016 | Komamura | B60R 21/0136 |
| 9,333,940 | B2 | 5/2016 | Hicken | |
| 9,358,945 | B2 * | 6/2016 | Yamada | B60R 21/268 |
| 9,376,084 | B2 * | 6/2016 | Choi | B60R 21/233 |
| 9,469,269 | B2 * | 10/2016 | Hiruta | B60R 21/231 |
| 9,505,371 | B2 | 11/2016 | Kawamura | |
| 9,505,372 | B2 * | 11/2016 | Yamada | B60R 21/205 |
| 9,550,470 | B2 | 1/2017 | Suk | |
| 9,561,774 | B2 * | 2/2017 | Cheng | B60R 21/239 |
| 9,610,916 | B2 | 4/2017 | Kawamura | |
| 9,676,355 | B2 * | 6/2017 | Kruse | B60R 21/0132 |
| 9,738,243 | B2 * | 8/2017 | Fukawatase | B60R 21/2338 |
| 9,776,593 | B2 | 9/2017 | Je | |
| 9,862,347 | B2 * | 1/2018 | Deng | B60R 21/203 |
| 10,065,594 | B2 * | 9/2018 | Fukawatase | B60R 21/2338 |
| 10,155,496 | B2 * | 12/2018 | Faruque | B60R 21/233 |
| 10,183,645 | B2 * | 1/2019 | Rose | B60R 21/01552 |
| 10,246,042 | B2 * | 4/2019 | Sumiya | B60R 21/23138 |
| 10,293,775 | B2 * | 5/2019 | Wang | B60R 21/205 |
| 10,351,090 | B2 * | 7/2019 | Yamada | B60R 21/2338 |
| 10,358,107 | B2 * | 7/2019 | Ohno | B60R 21/262 |
| 10,501,044 | B2 * | 12/2019 | Moon | B60R 21/233 |
| 10,501,045 | B2 * | 12/2019 | Yamada | B60R 21/2338 |
| 10,870,407 | B2 * | 12/2020 | Jung | B60R 21/203 |
| 2015/0266439 | A1 | 9/2015 | Foo | |
| 2015/0307056 | A1 | 10/2015 | Cheng | |
| 2016/0200281 | A1 | 7/2016 | Takeshita | |
| 2016/0288762 | A1 | 10/2016 | Deng | |
| 2017/0072896 | A1 | 3/2017 | Fukawatase | |
| 2017/0088083 | A1 | 3/2017 | Hiraiwa | |
| 2017/0151924 | A1 | 6/2017 | Ikenohata | |
| 2017/0253211 | A1 | 9/2017 | Choi | |
| 2017/0305380 | A1 | 10/2017 | Tsujimoto | |
| 2018/0354450 | A1 * | 12/2018 | Yamada | B60R 21/23138 |

\* cited by examiner

-Prior Art-

AIRBAG ARRANGEMENT

The present application claims priority to and the benefit of U.S. Provisional Patent Application No. 62/725,783, filed Aug. 31, 2018. The foregoing application is incorporated by reference herein in its entirety.

BACKGROUND

The application relates generally to airbag arrangements and, in particular, to an airbag arrangement for protecting an occupant of a vehicle in the event of a crash of a vehicle in an oblique direction.

In an oblique impact, a vehicle passenger may tend to move in a direction that is not directly forward relative to the vehicle. The disclosed airbag arrangement provides a configuration that protects the passenger from an oblique crash event occurring on the driver's side of the vehicle.

In general, the airbag arrangement includes an airbag module positioned to be located to protect a passenger of a vehicle. According to an exemplary embodiment, the airbag module includes an inflator and a three-piece airbag or cushion that preferably includes opposite side panels held together by a main panel.

A conventional configuration for a passenger airbag is shown in FIG. 1 with a main panel and two symmetrical side panels. Specifically, the airbag is formed of a main panel 110, and side panels, such as side panel 120, including a right side (when viewing the airbag from a seated position) panel and a left side panel.

The configuration of FIG. 1 is symmetrical across the main panel and as such restricts the side expansion. FIG. 1 does not provide protection in an oblique crash event. By way of example, the configuration of FIG. 1 does do not protect a passenger head motion during a vehicle collision in an oblique crash events. FIG. 2 shows a cross section of the airbag of FIG. 1.

SUMMARY

One exemplary embodiment disclosed is directed to airbag configured to protect a vehicle occupant in an oblique crash event. The airbag includes a first side panel, and a second side panel including an enlarged panel size configuration relative to the first side panel. The airbag also includes a main panel coupled to the first side panel along a first seam and coupled to the second side panel along a second seam. The main panel includes a curved configuration along the second seam to match expansion of the second side panel. The main panel and the second side panel are configured to provide protection for an oblique crash event to absorb energy from occupant movement in the oblique direction, and to retain and reduce head rotation of an occupant.

Another exemplary embodiment is directed to an airbag system configured to protect a vehicle occupant in an oblique crash event. The airbag system includes an airbag and a side curtain airbag (SCAB). The airbag can include a first side panel, and a second side panel including an enlarged panel size configuration relative to the first side panel. The airbag can also include a main panel coupled to the first side panel along a first seam and coupled to the second side panel along a second seam. The main panel includes a curved configuration along the second seam to match expansion of the second side panel. The main panel and the second side panel are configured to provide protection for an oblique crash event to absorb energy from occupant movement in the oblique direction and to retain and reduce head rotation of an occupant. The side curtain airbag (SCAB) is configured to contact the first side panel of the airbag. The SCAB may also be configured to control volume and loading of the airbag when inflated.

Another exemplary embodiment is directed to a method for controlling an airbag system. The method can include detecting, by an airbag system, a crash event. The method may also include controlling, by the airbag system, activation of an airbag and a side curtain airbag (SCAB). According to one embodiment, controlling includes activating the airbag to provide protection for an oblique crash event to absorb energy from occupant movement in the oblique direction and to retain and reduce head rotation of an occupant. Controlling can also include activating a side curtain airbag (SCAB) configured to contact a first side panel of the airbag, the SCAB configured to control volume and loading of the airbag when inflated.

It is to be understood that both the foregoing general description and the following detailed description are exemplary and explanatory only, and are not restrictive of the embodiments as claimed.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

Figure 1:
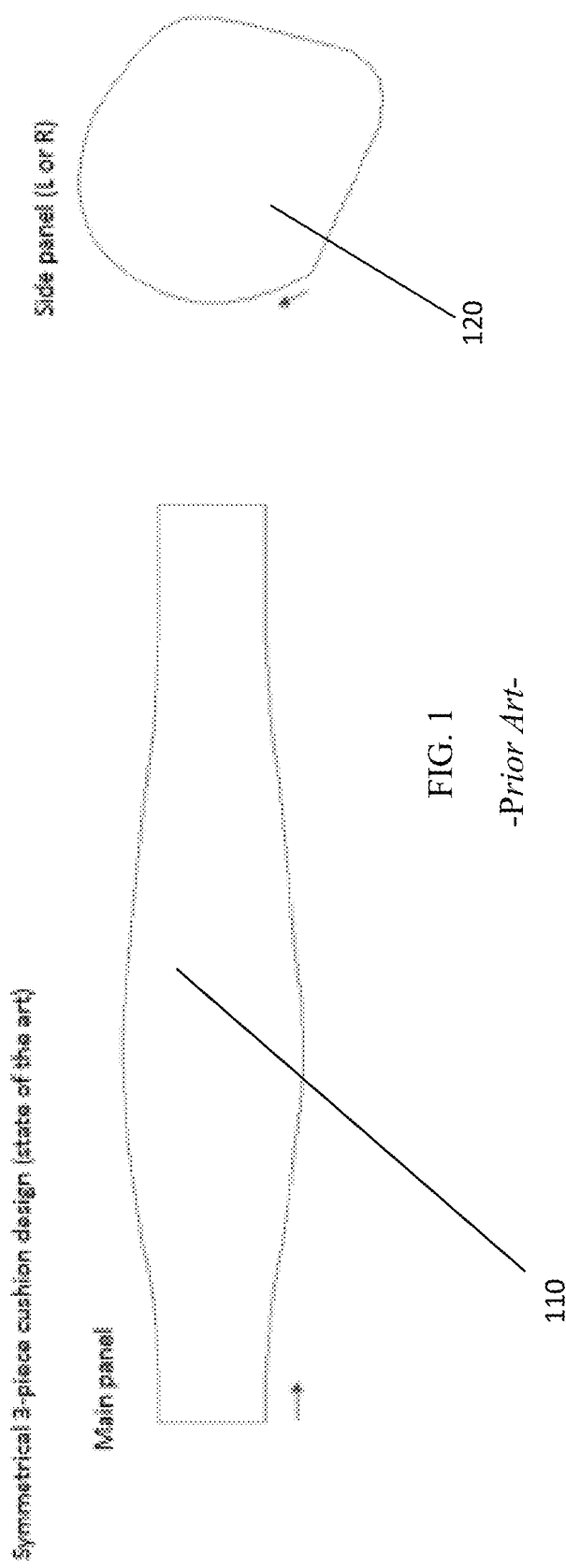
FIG. 1 is a plan view of the fabric panels used for fabricating a conventional three-piece passenger airbag.
Figure 2:
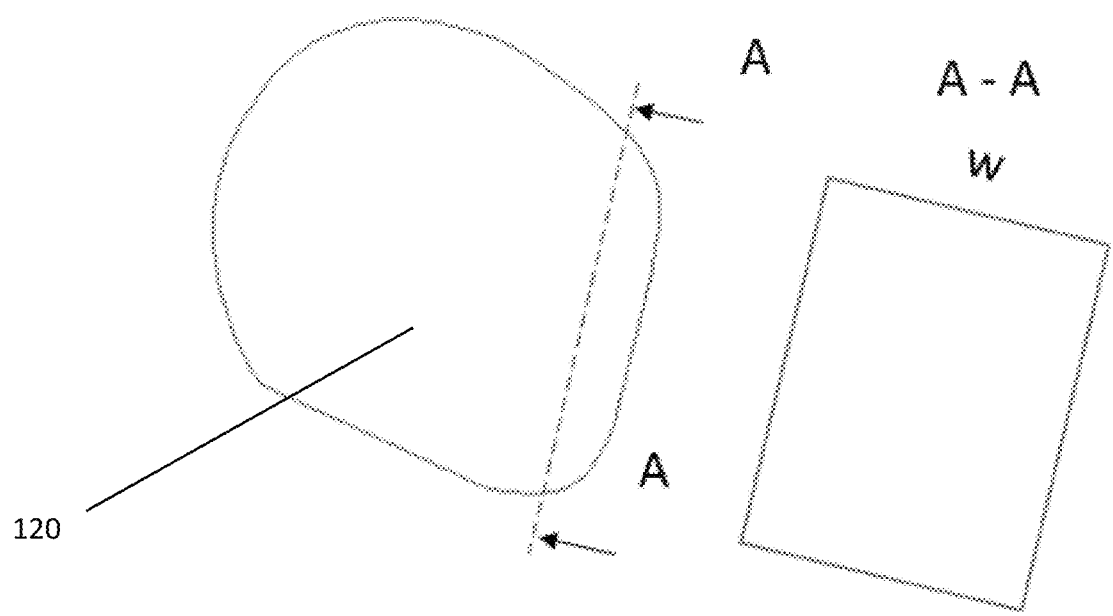
FIG. 2 discloses a representative drawing showing the width of interior volume of the conventional airbag of FIG. 1.

Various embodiments of the present disclosure will be described below with reference to the drawings. It is to be understood that both the foregoing general description and the following detailed description are exemplary and explanatory only, and are not restrictive of the disclosure.

According to an exemplary embodiment, an airbag configuration is provided. The airbag, such as a passenger airbag (PAB), may be configured to protect a vehicle occupant in oblique crash events. In one embodiment, the airbag includes a first side panel, second side panel, and a main panel. The second side panel can include an enlarged panel size configuration relative to the first side panel. According to another embodiment, a main panel is coupled to the first side panel along a first seam and coupled to the second side panel along a second seam. The main panel can include a curved configuration along the second seam to match expansion of the second side panel. According to one embodiment, the main panel and the second side panel are configured to provide protection for an oblique crash event to absorb energy from occupant movement in the oblique direction. The main panel and the second side panel are configured to retain and reduce head rotation of an occupant. Embodiments and features described herein with respect to passenger airbags may be applied to driver airbags (DAG).

As described herein, the airbag configuration provides enhanced protection for the passenger in the event of an oblique impact (including a side force component in addition to a front force component) involving the vehicle. This improved protection provides for both absorbing energy from the occupant due to movement in the oblique direction and retaining or reducing the rotation of the head of the occupant.

Another embodiment is directed to an airbag system. The airbag system can include an airbag configured to provide protection for an oblique crash event to absorb energy from occupant movement in the oblique direction and a side curtain airbag (SCAB). According to one or more embodiments, the SCAB may be configured to contact the first side panel of the airbag in order to control volume and loading of the airbag when inflated.

Another embodiment is directed to a method for controlling an airbag system. Control, as described herein, can include activation of one or more airbag configurations to protect a vehicle occupant in response to an oblique crash event. In one embodiment, a method includes detecting, by an airbag system, a crash event and controlling activation of an airbag and a side curtain airbag (SCAB). An airbag may be activated to provide protection for an oblique crash event to absorb energy from occupant movement in the oblique direction and to retain and reduce head rotation of an occupant. The side curtain airbag (SCAB) may be activated to contact a first side panel of the airbag, such that the SCAB is configured to control volume and loading of the airbag when inflated.

In the proposed systems, airbag configurations and processes can address impact events by airbag cushions that do not result in an occupants head hitting a central area of an airbag. Configurations can be configured to operate with one or more airbag elements of a vehicle to limit head rotation generally due to conventional bag geometry. Configurations discussed herein can also neutralize head rotation of a belted passenger from the oblique impact field in the head-bag interfacing. As such, configurations discussed herein can reduce and prevent injury associated with brain injury prevention criteria (BrIC).

Figure 3:
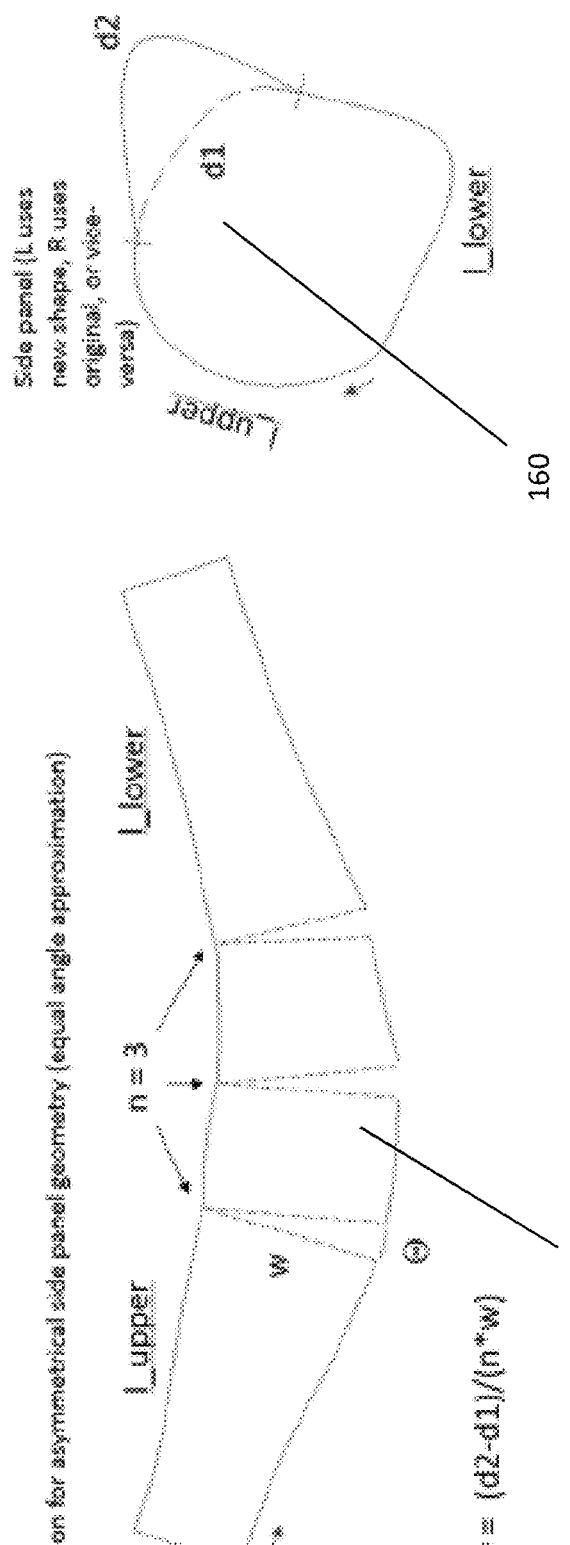
FIG. 3 is a plan view that depicts the panels of an embodiment of a passenger airbag that provides additional protection for a vehicle passenger in the event of an oblique crash event.
Figure 4:
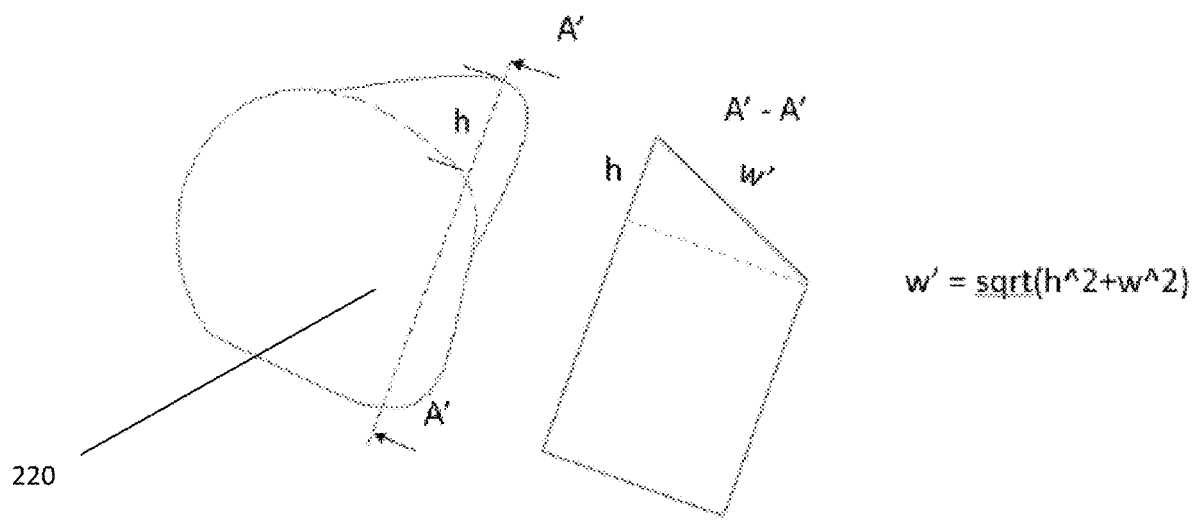
FIG. 4 discloses a representative drawing showing the width of interior volume of the airbag of FIG. 3.

As shown in FIG. 3, and according to an exemplary embodiment, improved protection for a passenger in the oblique direction is provided by creating a three-piece asymmetrical airbag. In addition to being asymmetrical, one or more panels of the airbag are configured to provide enhance protection. As shown in FIG. 3, one of the side panels 160 may be expanded in order to bias the cushion on one side with respect to the other. A complimentary curve is added to the main panel 150 to match the expansion of the side panel. The curve of the main panel 150 can be calculated as shown in FIG. 4 to match the expansion of the side panel. The upper and front faces of the cushion can be tailored to have the optimal oblique angle to the occupant or tailored to preserve the original cushion width or expand the width in a particular region, as desired. For example, as shown in FIG. 4 (which shows an XY plane (i.e., perpendicular to vehicle forward moving direction) cross section of the cushion through the front face) the airbag can be biased (e.g., increased volume) to anticipate the passenger's movement during an oblique crash event. FIG. 4 represents the biased and tailored design of the new cushion 200, which includes an enlarged side panel 220.

Each of the side panels 160 is generally planar (when the airbag is not inflated). In contrast, the main panel 150 wraps around the airbag. As a result, the entirety of the right edge of the main panel is connected along a seam (e.g., by stitching, sewing, or other suitable means) to the right panel and the entirety of the left edge of the main panel is connected along a seam (e.g., by stitching, sewing, or other suitable means) to the left panel. The main panel 150 may include an opening or slit for receiving an inflator. The airbag may include tethering or pleating to bias the volume of the airbag toward one side or the other about centerline of the main panel. The airbag is part of an airbag module that also includes the inflator.

Figure 5:
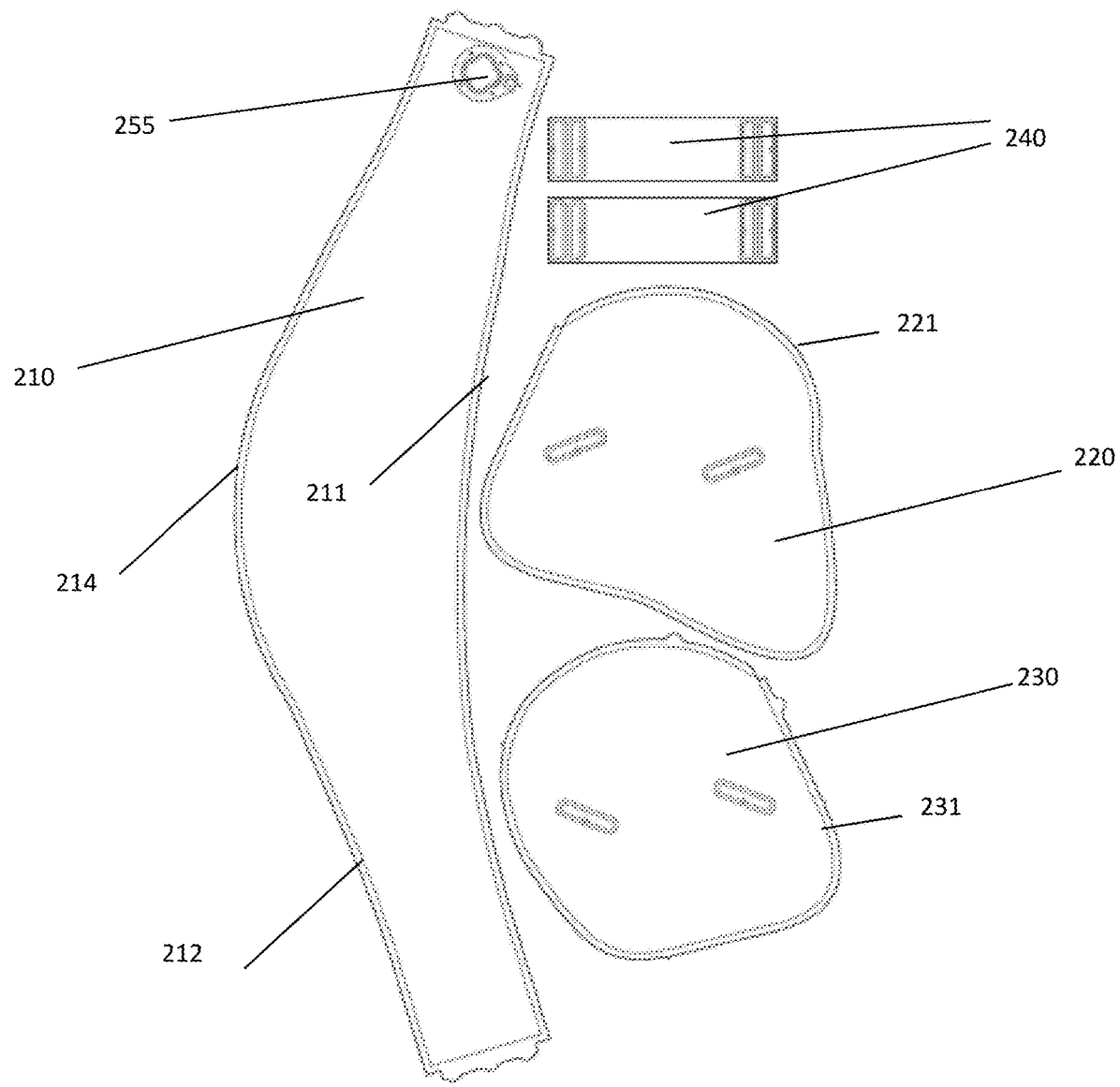
FIG. 5 discloses a representative cut set of panels used in the inflatable airbag cushion of FIG. 4.

FIG. 5 depicts the major panels used to assemble the improved three-piece passenger airbag. The airbag 200 includes a curved main panel 210, a standard side panel 230 (typically used on the outboard side of the airbag) (e.g., a first side panel) and an enlarged side panel 220 (typically used on the inboard side of the airbag) (e.g., a second side panel). The airbag 200 may also include internal tethers 240 that attach at one end to each of the side panels 220, 230.

Airbag 200 may be incorporated in an airbag configuration for automotive and other vehicles. Airbag 200 may protect a vehicle occupant, such as a front seat passenger, in oblique crash events. In one embodiment, the first side panel, side panel 230, and the second side panel, side panel 220, are arranged opposite one another. Side panel 220 can include an enlarged panel size configuration relative to the side panel 230. In one embodiment, side panel 220 and side panel 230 have non-uniform shapes. According to another embodiment, side panel 220 may include one or more portions, such as at least one of a top, bottom and seem portion, matching and/or similar in size and shape to corresponding portions of side panel 230. By way of example, side panel 220 may have a similar outer edge 221 relative to outer edge 231 of second side panel 230. Side panel 220 may also include an enlarged surface area for an inboard side direction of side panel 220 relative to side panel 230. According to another embodiment, side panel 220 can include an inboard side portion having an enlarged height relative to a portion of side panel 230. Providing an increased surface area for side panel 220 may provide additional volume for airbag 220 when deployed. In certain embodiments, the increased surface area of side panel 220 may allow for expansion of airbag 200 and for contact of a side curtain airbag with airbag 220 in response to an oblique crash event.

According to another embodiment, main panel 210 is coupled to side panel 230 along a first seam and coupled to side panel 220 along a second seam. Main panel 210 can include a curved configuration, shown as 214, along the second seam to match expansion of side panel 220. According to one embodiment, main panel 210 and side panel 220 are configured to provide protection for an oblique crash event to absorb energy from occupant movement in the oblique direction. Main panel 210 and side panel 220 are configured to retain and reduce head rotation of an occupant.

In one embodiment, main panel 210, side panel 220, and side panel 230 are each formed from a planar material, an entire first edge 211 of main panel 210 is joined to an entire outer edge 231 of side panel 230 by the first seam, and an entire second edge 212 of main panel 210 is joined to an entire outer edge 221 of the second side panel 220 by the second seam. Main panel 210 and side panel 220 form a bulging region 213 having increased volume for protection in the event of an oblique crash event occurring on a driver side of a vehicle.

Figure 12:
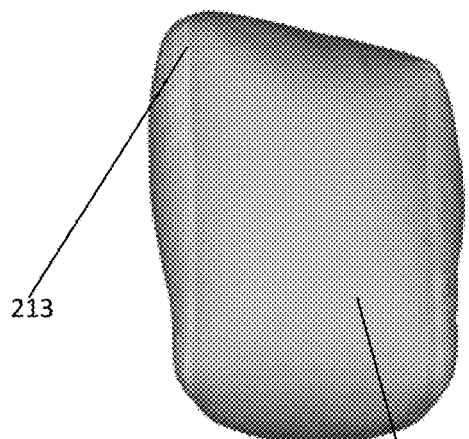
FIG. 12 is a frontward view (from the passenger's perspective) of the airbag of FIG. 6.
Figure 13:
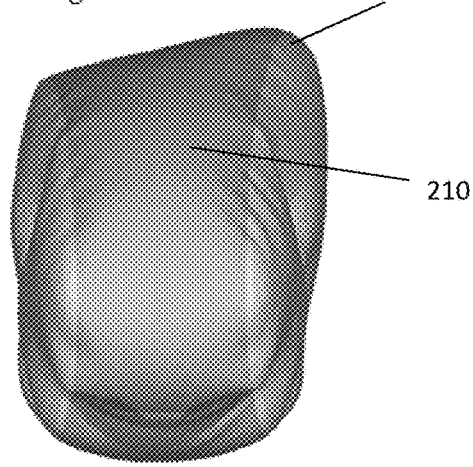
FIG. 13 is a rearward view (from the windshield side) of the airbag of FIG. 6.

According to one embodiment, curved configuration 214 of main panel 210 and side panel 220 provide expansion of airbag 200 in an inboard direction and opposite an oblique direction. As shown in FIGS. 12 and 13, expansion of airbag 200 may be configured to limit occupant head rotation due to movement of the airbag toward the center of the vehicle.

Airbag 220 may include tethers 240 attaching to the interior of side panel 220 and side panel 230. Tethers 240 may be configured to bias volume of the airbag about a centerline of the main panel.

Figures 6, 7:
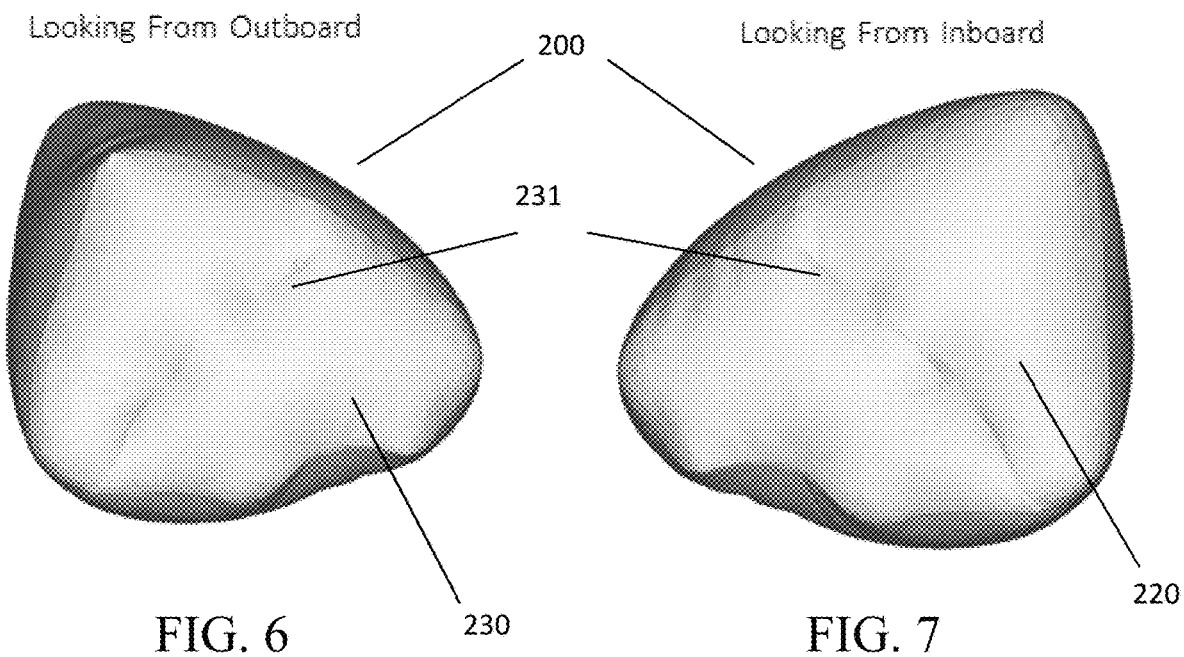
FIG. 6 is a side view from the outboard side of the passenger compartment of the vehicle of an assembled and inflated airbag made from the panels shown in FIG. 5.
FIG. 7 is a side view from the inboard side of the airbag shown in FIG. 6.
Figures 8, 9:
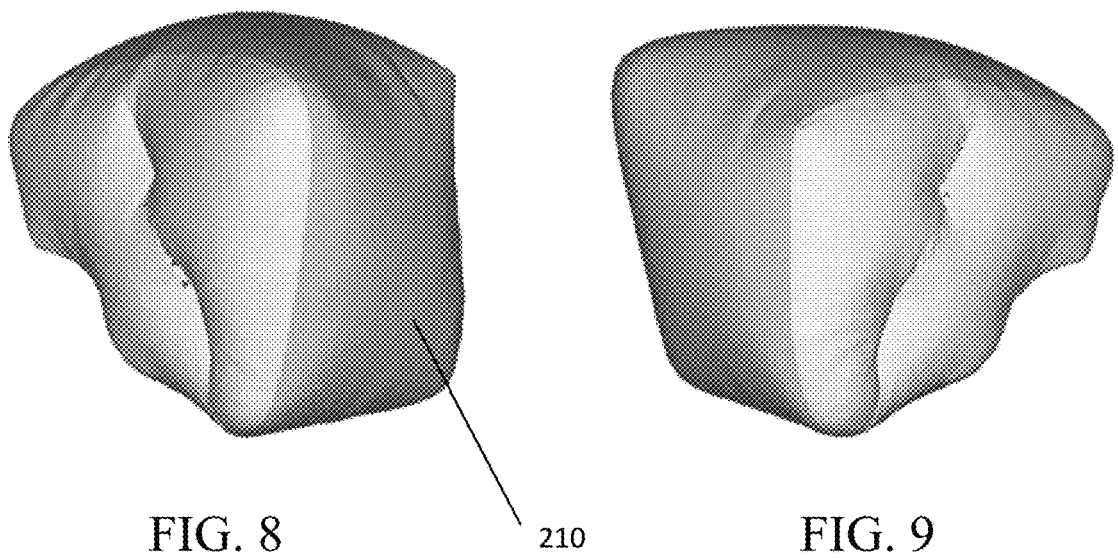
FIG. 8 is a perspective view from the inboard side of the airbag of FIG. 6.
FIG. 9 is a perspective view from the outboard side of the airbag of FIG. 6.

FIGS. 6-13 depict various views of the inflated asymmetrical or biased passenger airbag 200. In FIG. 6, a view of airbag 200 as looking from outboard is provided, while a view looking from inboard is provided in FIG. 7. As can be seen in FIG. 7 the view looking from inboard, such as from a vehicle drive seat when the airbag 200 is installed as a passenger airbag (PAB), shows the increased dimension and size. Side panels 220 and 230 may include one or more seams shown as 232 that may relate to formation of the airbag shape and or connection to tethers (e.g., tethers 240). FIG. 8 illustrates an inboard isometric view and FIG. 9 illustrates an outboard isometric view of airbag 200 according to one or more embodiments.

Figure 10:
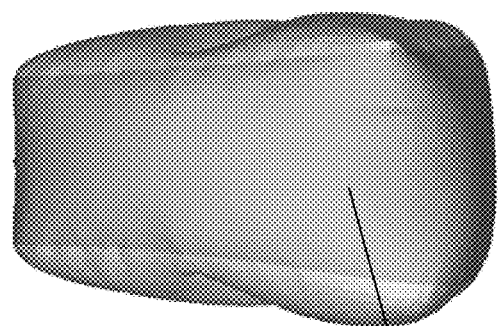
FIG. 10 is a top view of the airbag of FIG. 6.
Figure 11:
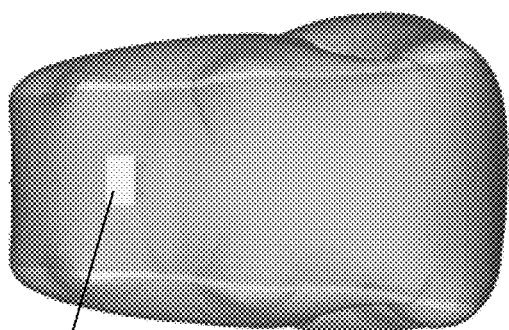
FIG. 11 is a bottom view of the airbag of FIG. 6.

FIG. 10 is a top view of airbag 200 with main panel 210 identified, and FIG. 11 is a bottom view of airbag 200. As shown in FIG. 11 (the bottom view of the airbag 200), the main panel 210 may include an opening 255 to allow the inflator to be located in the interior of the airbag 200 and/or allow engagement with an inflator.

FIG. 12 is a frontward or occupant view (from the passenger's perspective) of the airbag 220 with a bulging region generally shown by 213 that is configured to provide protection from an oblique crash event. FIG. 13 is a rearward view (from the windshield side/through the windshield) of airbag 200.

Figure 14:
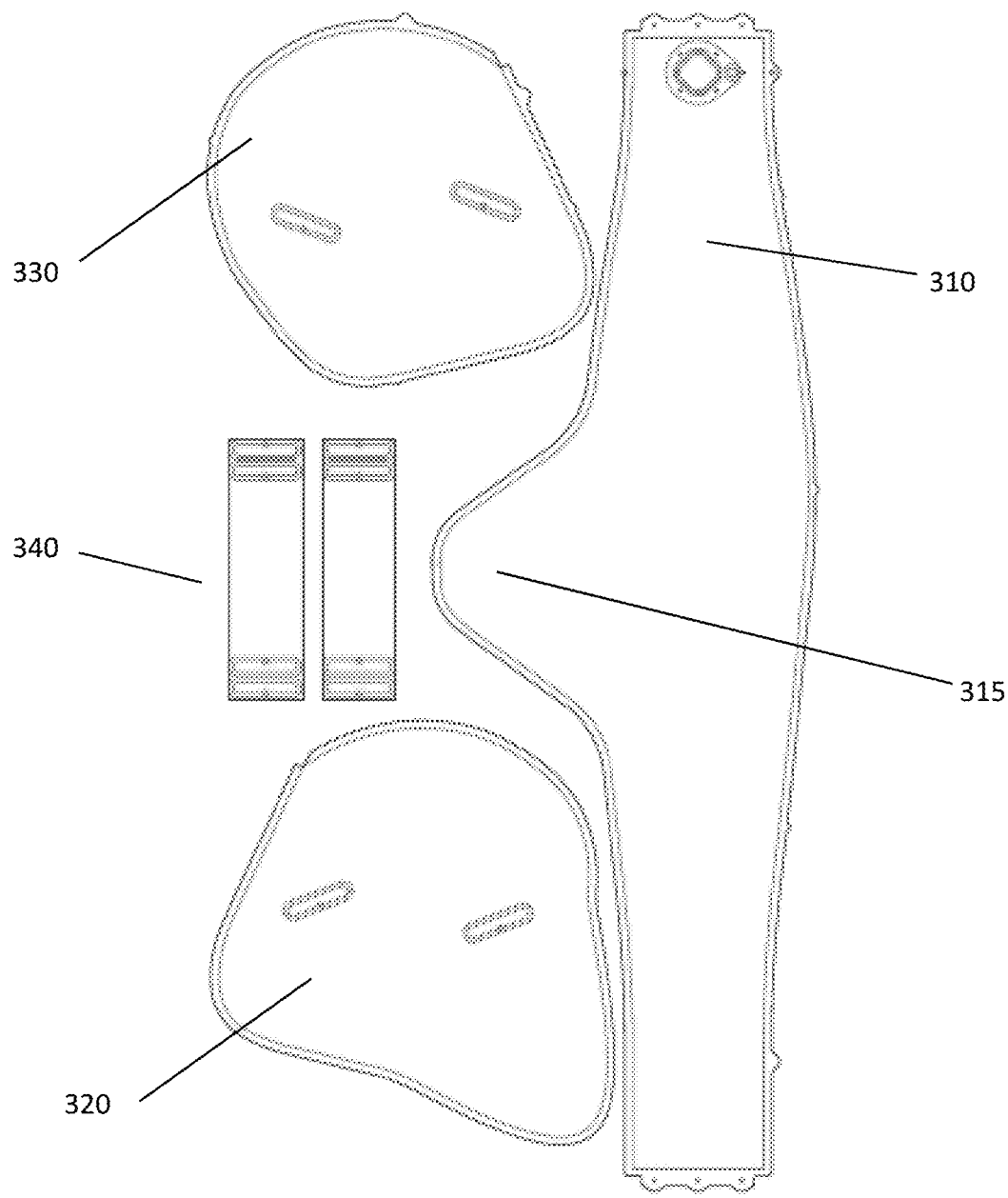
FIG. 14 discloses a representative cut set of panels used in an alternative embodiment of an airbag cushion.

FIG. 14 depicts the major panels used to assemble an alternative embodiment of the improved three-piece passenger airbag. The asymmetrical airbag includes a curved main panel 310. The main panel 310 includes a bulging region 315 that functions to create a region of increased volume in order to provide for increased protection in the event of an oblique crash event. The airbag also includes an enlarged side panel 320 (typically used on the inboard side of the airbag), and a standard side panel 330 (typically used on the outboard side of the airbag). The airbag may also include internal tethers 340 that attach at one end to each of the side panels 320, 330.

Figure 15:
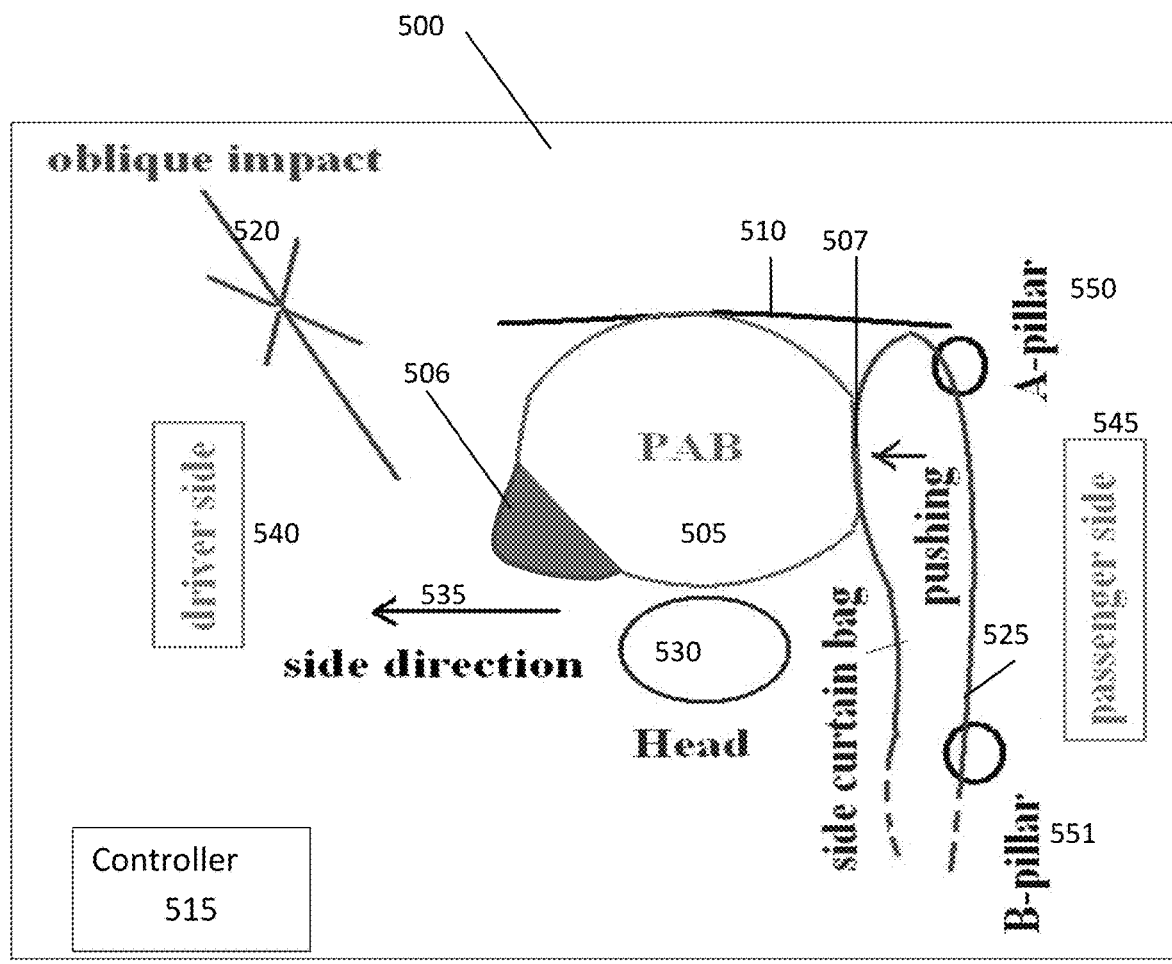
FIG. 15 is a top view schematic drawing showing an airbag system including a front mounted passenger airbag and a side airbag and also showing the interaction between a side airbag and a front passenger airbag during an oblique impact involving the vehicle.
Figure 16:
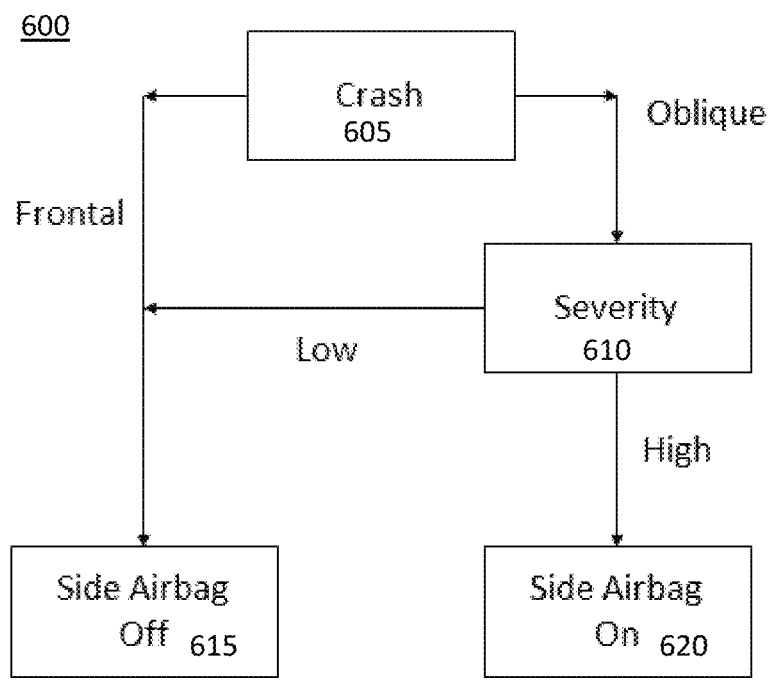
FIG. 16 is a flow chart for a process run by an airbag control module to determine whether or not to initiate the inflation of a side airbag.
Figure 17:
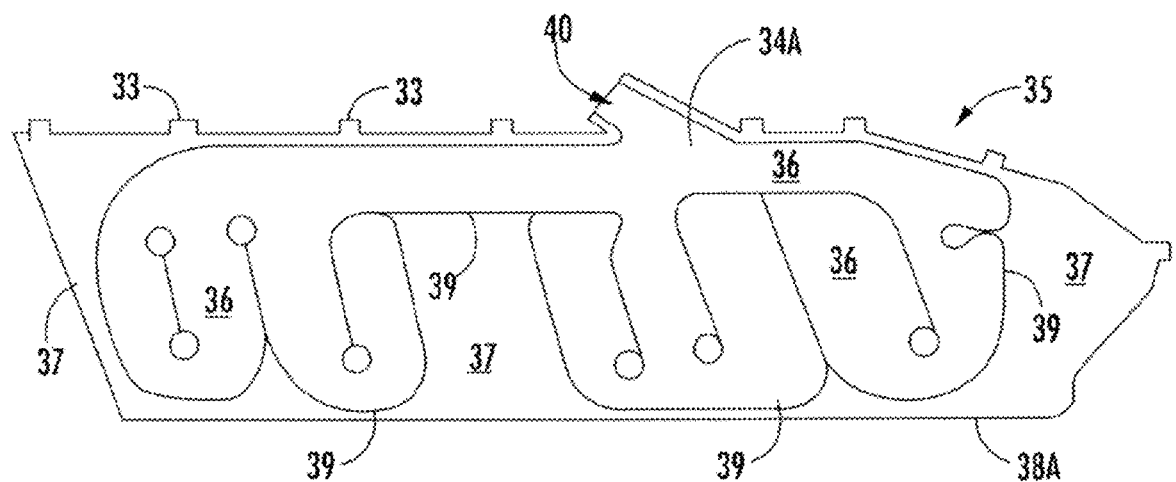
FIG. 17 is a side view of a side curtain airbag that could be used in the system shown in FIG. 15.

FIGS. 15-17 are directed to yet another alternative embodiment of an airbag and airbag arrangement configured to provide passenger protection in the event of an oblique crash event involving the vehicle. The arrangement disclosed in FIG. 15, for example, includes a side airbag (e.g., a side curtain airbag (SCAB)) at the passenger side window to create an approximate balance of restraint provided by the front mounted passenger airbag and seat belt to the head and torso in an oblique crash event. The side airbag functions as an active component that engages with the PAB. In the airbag arrangement shown in FIG. 15, the passenger airbag may be the asymmetrical airbag described above.

FIG. 15 illustrates an airbag system 500 configured to protect a vehicle occupant in an oblique crash event. According to one embodiment, system 500 includes an airbag, such as passenger airbag (PAB) 505 which may be mounted to and/or in a vehicle compartment, such as vehicle dashboard 510. Airbag 505 may be controlled by a vehicle controller, such as controller 515 which may be configured to detect a vehicle condition and activate airbag 505. According to one embodiment, airbag 505 may include one or more panels configured to provide protection for an oblique crash event, shown generally by direction arrow 520, to absorb energy from occupant movement in the oblique direction. FIG. 15 illustrates occupant head 530 and bulge 506 of airbag 505 which may retain and reduce head rotation of an occupant. According to one embodiment, system 500 may include a side curtain airbag (SCAB) 525 configured to contact a panel or portion shown as 507 of airbag 505. According to one embodiment, SCAB 525 is configured to control volume and loading of the airbag 505, and in particular bulge 506 when airbag 505 is inflated to provide protection for a vehicle occupant in an oblique crash event. A first side panel of airbag 505 may be configured to contact with SCAB 525 when SCAB 525 is inflated to control volume and loading of the airbag 505. An oblique crash event shown as 520 may result in passenger motion, such as motion of head 530, in side direction 535. Bulge 506 may be controlled to protect against head rotation in side direction 535. Controller 515 may be configured to control airbags 505 and 525. System 500 is shown in a vehicle relative to driver side 540 and passenger side 545. System 500 may include scab 525 mounted between a vehicle A pillar 550 and B pillar 551.

Although FIG. 15 illustrates airbag 505 mounted to dashboard 510, it should be appreciated that airbag may be mounted to at least one of a steering wheel, and vehicle compartment. In addition, the dimensions and configurations of airbag 505 may be reversed to allow for mounting as a driver side airbag.

In the event of a driver's side oblique event, the side airbag may not directly cushion the passenger but operates to engage with the front mounted passenger airbag laterally from the window-side of the passenger airbag. When the side airbag inflates, the side airbag pushes the front mounted passenger airbag away from the passenger window side toward the driver's side of the vehicle. As a result of the movement of the passenger airbag toward the driver side of the vehicle, the passenger airbag will work with the seatbelt in a more balanced way to restrain the passenger during an oblique crash event. The aforementioned push provided by the side airbag not only helps to keep an inflated passenger chamber between the occupant and any interior trim, thereby avoiding any potential head contact, but also allows the PAB volume to be optimized. A standalone three-piece PAB that is configured to control oblique loading and prevent an occupant from contacting the vehicle due to inboard movement of the occupant will need to be much larger than a conventional PAB. Thus, the push provided by the side airbag allows for a smaller and/or more optimized PAB volume to be utilized thereby providing for reductions in cost and volume (both storage and deployed volumes).

Operation of the airbag arrangement including both the PAB and the SCAB is controlled by a control module. The control module or controller controls the operation of the airbags in the event of a vehicle emergency. For example, when a front crash occurs the module will only initiate the deployment of the PAB. In a front crash, the SCAB is not needed and remains in an "OFF" status. When an oblique crash occurs, the controller directs both the PAB and the SCAB to initiate and deploy. For example, the controller may utilize an algorithm or control methodology such as shown in FIG. 16. Although not shown in FIG. 16, the algorithm or methodology may take into account the size of the occupant. So, for example, in the case of a small occupant or child it may not be necessary to deploy the SCAB to push the PAB when an oblique crash event occurs, depending on other factors such as the type of vehicle, etc.

In general, the airbag arrangement disclosed in FIG. 15 provides for limiting the head rotation of the occupant in the case of an oblique crash event due to the movement of the PAB toward the center of the vehicle. In addition, the inward movement of the PAB may neutralize any head rotation of the passenger due to the oblique crash event. This head rotation reduction can be provided without softening the bag and, thus, the system described herein provides for rotation control without a corresponding increase in forward head movement.

In other embodiments, alternative devices may be provided for pushing the PAB toward the driver's side of the vehicle. For example, a projecting bolster or similar vehicle trim component may be used. Although the present application describes the combination of a PAB and side airbag, a similar concept could be implemented on the driver side of the vehicle. For example, a driver side airbag could deploy and push or displace the frontal driver airbag (DAB) toward the inboard of the vehicle in order to provide protection and coverage for the driver's head and prevent impact and/or head rotation.

FIG. 16 is a flow chart for a process run by an airbag control module to determine whether or not to initiate the inflation of a side airbag. According to one embodiment, a vehicle controller, such as controller 515 of FIG. 15, may be configured to control operation of one or more airbags of a vehicle. As shown in FIG. 16, the controller may be configured to detect a vehicle event, such as a crash event at block 605. At decision block 610 the controller may determine whether the crash event requires activation of one or more vehicle airbags. Process 600 may include controlling, by an airbag system, activation of an airbag and a side curtain airbag (SCAB). Process 600 can include activating an airbag to provide protection for an oblique crash event to absorb energy from occupant movement in the oblique direction and to retain and reduce head rotation of an occupant. Process 600 can also include activating a side curtain airbag (SCAB) configured to contact a first side panel of the airbag, the SCAB configured to control volume and loading of the airbag when inflated. When severity is determined to be low, a side airbag may not be triggered at block 615. When severity is determined to be high, a side airbag may be triggered at block 620. Control by the controller and process 600 may include synchronizing and/or controlling the timing of an airbag such as a PAB with a SCAB. In certain embodiments a SCAB may be activated to expand a side panel of a vehicle airbag (e.g. airbag 505) when an oblique crash event is detected.

An exemplary embodiment of a side curtain airbag that may be used in conjunction with the various embodiments of the passenger airbag described above is shown in FIG. 17. For example, a side-curtain airbag module may be stored within and configured to deploy from a roof-rail of a vehicle. The SCAB module may provide occupant restraint to at least one passenger or occupant during airbag deployment. According to an exemplary embodiment, the SCAB module is configured to provide restraint to at least one occupant located on the passenger-side of the vehicle, during an airbag deploying event.

According to an exemplary embodiment, the SCAB module includes a plurality of mounting members 33 configured to couple the module to the roof-rail of the vehicle, an airbag cushion 35 having an inflatable chamber 36 configured to inflate to provide cushioned restraint to an occupant during airbag deployment, and an inflator to provide inflation gas to inflate the inflatable chamber 36 of the cushion 35. The inflator may be configured using any known or future developed methods, and may include any device, such as a pyrotechnic device, for producing inflation gas to inflate the airbag cushion 35.

Upon being triggered to deploy, the inflator inflates the airbag cushion 35, which breaches the roof-rail trim (in which it is stored in) due to the increasing high internal pressure caused by the generated inflation gas. The airbag cushion 35 unfolds with the leading edge 38A of the airbag cushion moving away from the roof-rail and the trailing edge of the cushion (e.g., mounting members 33) in a direction substantially downward and along the interior surface of the door assemblies.

FIG. 17 shows the airbag cushion 35 in a flat orientation, prior to any folding or rolling of the cushion. The airbag cushion 35 may be formed from one or more airbag panels coupled together through conventional methods (e.g., stitching, adhesive) at seams 39 to form at least one inflatable chamber 36 configured to receive inflation gas from the inflator during deployment. According to an exemplary embodiment, the airbag cushion 35 is formed from an outer or outboard panel or layer 34A and an inner or inboard panel or layer connected together through a plurality of seams 39. The seams 39 may form one or more non-inflatable portions 37 on the airbag cushion 35, whereby the non-inflatable portions 37 are configured not to receive inflation gas during airbag deployment.

The airbag cushion 35 includes an inflator connection (or inlet) 40, which allows the inflator to couple to the cushion 35 so that upon deployment, inflation gas is pushed through the inflator inlet 40 and into the inflatable chamber 36. According to an exemplary embodiment, the inlet 40 is integrally formed with the panels 34 forming the airbag cushion 35. According to other embodiments, the inlet may be formed separately then connected to the airbag cushion 35.

The inflatable chamber 36 of the airbag cushion 35 may include pockets or sub-chambers that are formed by seams 39 (or stitches). The pockets may be fluidly connected to other pockets or sub-chambers so that inflation gas from the inflator may pass through a portion of the inflatable chamber 36 into the various pockets. The pockets of the inflatable chamber 36 may be located on the cushion 35 in a configuration to provide optimal restraint to one or more occupants, and the location of the pockets may be varied to accommodate different vehicle requirements or configurations. Further, the seams 39 may divide the pockets into multiple pockets, which may be to influence the deployment sequence of the cushion.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "fore," "aft," "inboard," "outboard," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the airbags shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An airbag configured to protect a vehicle occupant in an oblique crash event, the airbag comprising:
   a first side panel;
   a second side panel, the second side panel including an enlarged panel size configuration relative to the first side panel; and
   a main panel coupled to the first side panel along a first seam and coupled to the second side panel along a second seam,
   wherein the first seam extends along the entire perimeter of the first side panel and the second seam extends along the entire perimeter of the second side panel;
   wherein the main panel includes a curved configuration along the second seam to match expansion of the second side panel, and
   wherein the main panel and the second side panel are configured
   to provide protection for an oblique crash event to absorb energy from occupant movement in the oblique direction, and
   to retain and reduce head rotation of an occupant.

2. The airbag of claim 1, wherein the main panel, the first side panel, and the second side panel are each formed from a planar material.

3. The airbag of claim 1, wherein the main panel and the second side panel form a bulging region having increased volume for protection in the event of an oblique crash event occurring on a driver side of a vehicle.

4. The airbag of claim 1, wherein the curved configuration of the main panel and the second side panel are configured to provide expansion of the airbag in an inboard direction and opposite the oblique direction, the expansion configured to limit occupant head rotation due to movement of the airbag toward the center of the vehicle.

5. The airbag of claim 1, wherein the main panel includes an opening configured to engage with an inflator.

6. The airbag of claim 1, wherein the airbag is configured to be mounted to at least one of a vehicle dashboard, steering wheel, and vehicle compartment.

7. The airbag of claim 1, wherein the airbag is configured to operate with a side curtain airbag (SCAB), the first side panel configured to contact the SCAB when the SCAB is inflated to control volume and loading of the airbag.

8. The airbag of claim 1, wherein the second side panel includes an enlarged surface area for an inboard direction of the airbag relative to surface area provided by the first side panel, the second side panel including an enlarged height relative to the first side panel.

9. The airbag of claim 1, wherein the first side panel and the second side panel have non-uniform shapes.

10. The airbag of claim 1, further comprising at least one internal tether attaching to the first side panel and to the second side panel, the at least one tether configured to bias volume of the airbag about a centerline of the main panel.

11. An airbag system configured to protect a vehicle occupant in an oblique crash event, the airbag system comprising:
    an airbag including
    a first side panel;
    a second side panel, the second side panel including an enlarged panel size configuration relative to the first side panel; and
    a main panel coupled to the first side panel along a first seam and coupled to the second side panel along a second seam, wherein the main panel includes a curved perimeter along the second seam to match the perimeter of the second side panel, and wherein the main panel and the second side panel are configured to provide protection for an oblique crash event to absorb energy from occupant movement in the oblique direction and to retain and reduce head rotation of an occupant; and a side curtain airbag (SCAB) configured to contact the first side panel of the airbag, the SCAB configured to control volume and loading of the airbag when inflated.

12. The airbag system of claim 11, wherein the main panel, the first side panel, and the second side panel are each formed from a planar material, an entire first edge of the main panel is joined to an entire outer edge of the first side panel by the first seam, and an entire second edge of the main panel is joined to an entire outer edge of the second side panel by the second seam.

13. The airbag system of claim 11, wherein the main panel and the second side panel form a bulging region having increased volume for protection in the event of an oblique crash event occurring on a driver side of a vehicle.

14. The airbag system of claim 11, wherein the curved configuration of the main panel and the second side panel are configured to provide expansion of the airbag in an inboard direction and opposite the oblique direction, the expansion configured to limit occupant head rotation due to movement of the airbag toward the center of the vehicle.

15. The airbag system of claim 11, wherein the main panel includes an opening configured to engage with an inflator.

16. The airbag system of claim 11, wherein the vehicle is configured to be mounted to at least one of a vehicle dashboard, steering wheel, and vehicle compartment.

17. The airbag system of claim 11, wherein the second side panel includes an enlarged surface area for an inboard direction of the airbag relative to surface area provided by the first side panel, the second side panel including an enlarged height relative to the first side panel.

18. The airbag system of claim 11, wherein the first side panel and the second side panel have non-uniform shapes.

19. The airbag system of claim 11, further comprising at least one internal tether attaching to the first side panel and to the second side panel, the at least one tether configured to bias volume of the airbag about a centerline of the main panel.

20. A method for controlling an airbag system configured to protect a vehicle occupant in an oblique crash event, the method comprising:

detecting, by the airbag system, the oblique crash event; and controlling, by the airbag system, activation of an airbag and a side curtain airbag (SCAB), wherein controlling includes activating the airbag upon the detection of the oblique crash event so that the airbag is configured to provide protection and to absorb energy from occupant movement in the oblique direction and to retain and reduce head rotation of the occupant, and activating the side curtain airbag (SCAB) configured to contact a first side panel of the airbag, the SCAB configured to control volume and loading of the airbag when inflated;

wherein the controlling includes activating the SCAB upon detection of the oblique crash event when the severity of the oblique crash event is determined to be high, and not activating the SCAB upon detection of the oblique crash event when the severity of the oblique crash event is determined to be low.

\* \* \* \* \*